United States Patent Office 3,833,672
Patented Sept. 3, 1974

3,833,672
HALOGENATED DIBENZYLPHENOLS AND
THEIR PREPARATION
Jacques Debat, Paris, France, assignor to Institut de Recherches Chimiques et Biologiques Appliquees, I.R.C.E.B.A., Paris, France
No Drawing. Filed June 30, 1972, Ser. No. 268,204
Claims priority, application France, July 6, 1971, 7124696
Int. Cl. C07c 39/16
U.S. Cl. 260—619 A
9 Claims

ABSTRACT OF THE DISCLOSURE

The invention provides novel halogenated dibenzylphenols of the formula:

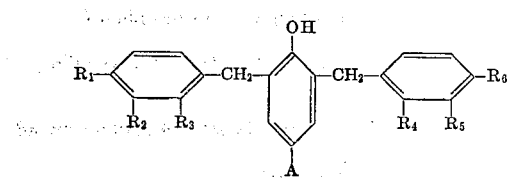

in which A is a halogen atom and each of $R_1$, $R_2$, $R_3$, $R_4$, $R_5$ and $R_6$ is a hydrogen or halogen atom provided that
(a) A is not a fluorine atom when $$R_1=R_2=R_3=R_4=R_5=R_6=H,$$

and (b) A is not a chlorine atom when (1) simultaneously $R_3=R_4=H$ and $R_1=R_2=R_5=R_6=Cl$,
(2) simultaneously $R_2=R_3=R_4=R_5=H$ and $R_1=R_6=Cl$, and
(3) simultaneously $R_1=R_2=R_5=R_6=H$ and $R_3=R_4=Cl$.

These compounds have bacteriostatic and fungistatic properties.

---

The present invention is concerned with certain novel halogenated dibenzylphenols and with a process for their preparation.

We have found that halogenated dibenzylphenols of formula I:

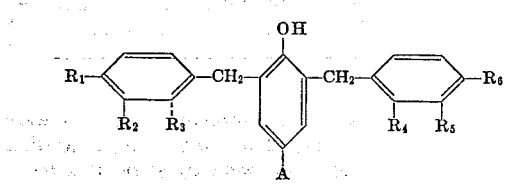

in which A is a halogen atom and each of $R_1$, $R_2$, $R_3$, $R_4$, $R_5$ and $R_6$ is a hydrogen or halogen atom provided that
(a) A is not a fluorine atom when $$R_1=R_2=R_3=R_4=R_5=R_6=H,$$ and (b) A is not a chlorine atom when (1) simultaneously $R_3=R_4=H$ and $R_1=R_2=R_5=R_6=Cl$,
(2) simultaneously $R_2=R_3=R_4=R_5=H$ and $R_1=R_6=Cl$, and
(3) simultaneously $R_1=R_2=R_5=R_6=H$ and $R_3=R_4=Cl$, have valuable bacteriostatic properties.

Various dibenzylphenols substituted in the phenolic ring with halogen or trifluoromethyl have been prepared and their bacteriostatic activity has been studied. Whilst all the halogenated dibenzylphenols of formula I have good bacteriostatic activity, certain of them have a substantially greater bacteriostatic activity than the substituted dibenzylphenols previously studied.

The compounds of formula I as defined above are novel and constitute one aspect of the present invention.

The asymmetric compounds of formula I, that is those in which the rings of the benzyl groups are substituted in an asymmetric fashion with respect to the phenolic ring, can be prepared by a two-stage process.

In the first stage, a monobenzyl-phenol is prepared by a reaction of the Friedel-Craft type, that is by condensing a phenol with an appropriately substituted benzyl chloride. The reaction is preferably carried out in the presence of zinc chloride as catalyst and in the presence of an inert organic solvent, such as chloroform, at the reflux temperature of the solvent. The reaction is carried out with a stoichiometric excess of the phenol with respect to the benzyl chloride, that is to say about one mole of phenol for 0.75 mole of benzyl chloride, in order to avoid the formation of the 2,6-dibenzyl-phenol. The monobenzyl-substituted derivative is obtained according to the following reactions:

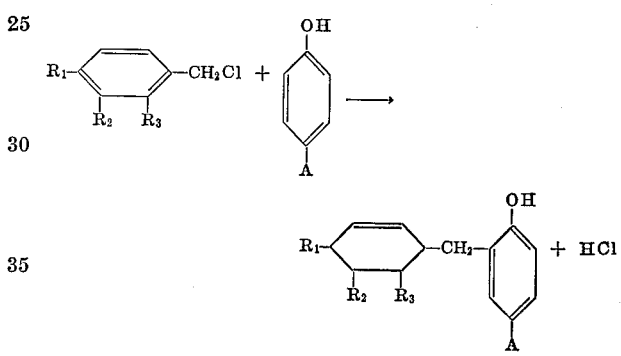

After separation and careful purification of this derivative, the dibenzyl-substituted derivative is prepared, in a second stage, by reacting, in the same manner as previously, the monobenzyl-phenol obtained with a differently substituted benzyl chloride:

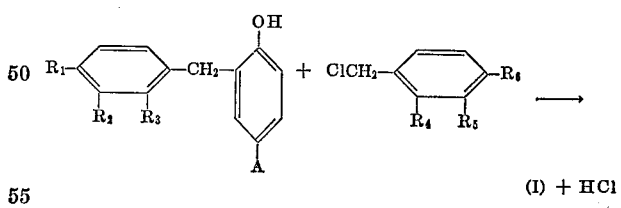

(I) + HCl

In this second stage, the reactants are used in substantially stoichiometric quantities and preferably in the ratio of 1.1 mole of the benzyl chloride per 1 mole of the monobenzyl-phenol.

In order to prepare a symmetrical compound, the two stages can be combined into one: the phenol is reacted with an excess of the appropriately substituted benzyl chloride (that is with more than 2 moles of the benzyl chloride per 1 mole of phenol) to yield directly the symmetrical 2,6-dibenzyl-substituted derivative.

The compounds of formula I are antimicrobial agents, in particular bacteriostatic and fungistatic agents. The present invention accordingly also comprises pharmaceutical compositions comprising at least one compound of formula I, as active ingredient, and an inert, physiologically acceptable carrier. These compositions preferably comprise from 0.1 to 80% by weight of the active ingredient.

In order that the invention may be more fully understood, the following examples are given by way of illustration only:

EXAMPLE 1

Preparation of An Asymmetric Compound 2-(4'-fluoro-benzyl)-4-fluoro-6-(2",4"-dichloro-benzyl)-phenol 1st stage: 40 g. of p-fluoro-benzyl chloride and 40 g. of p-fluorophenol were dissolved in 200 ml. of anhydrous chloroform. 18 g. of melted zinc chloride were added to the solution and the latter was heated to reflux for 19 hours, the evolution of HCl stopping after about 12 hours. After cooling, 200 ml. of distilled water were added. After agitation and decantation, the organic phase was removed. The aqueous phase was extracted twice with 20 ml. of chloroform and the combined chloroform extracts were washed four times with 25 ml. of distilled water. The chloroform solution was dried over 75 g. of anhydrous sodium sulphate and, as a result, became clear. The solution was filtered and the solvent then eliminated by distillation, first under normal pressure and then under reduced pressure. At a pressure of 0.4 mm. Hg, unreacted starting materials distilled over at from 80 to 110° C. and the product, 2-(4'-fluoro-benzyl)-4-fluoro - phenol, distilled at about 160° C.

This product was recrystallised in petroleum ether. Thin layer chromatography on silica gel, using benzene as solvent, showed that the product did not contain any di-substituted derivative which it would be almost impossible to separate from the final product after the second stage. The yield was 71%.

2nd stage: 40 g. of the product obtained in the first stage, 40 g. of 2,4-dichloro-benzyl chloride, and 18 g. of melted zinc chloride were dissolved in 200 ml. of anhydrous chloroform and reacted in the same manner as above by heating the solution to reflux for 26 hours. After recovery of the product formed in chloroform solution as in the first stage, it was separated by distillation. At a pressure of 0.3 mm. Hg, 2-(4'-fluoro-benzyl)-4-fluoro-6-(2",4"-dichloro-benzyl)-phenol distilled over between 205 and 212° C. The yield was 61%.

EXAMPLES 2 TO 12

The following examples give brief details of a number of further specific compounds according to the invention. Symmetrical compounds were prepared using the procedure described in Example 1; asymmetrical compounds were prepared using a procedure substantially corresponding to the first stage of Example 1 but with a stoichiometric excess of the benzyl chloride, that is with slightly more than 2 moles of the benzyl chloride per mole of the phenol.

For each example, there is given the name of the compound obtained, the empirical formula, the molecular weight and physical constants; boiling point (b.p.) under reduced pressure or melting point (m.p.) measured on a Maquenne block, and, in some cases, refractive index ($n$).

Example 2.—2,6-di-(4'-fluoro-benzyl)-4-fluoro-phenol $C_{20}H_{15}OF_3 = 328$; b.p.$_{.1.5}$ = 180–200° C; $n_{23°}$ = 1.5787.

Example 3.—2,6-di-(4'-chloro-benzyl)-4-fluoro-phenol $C_{20}H_{15}OCl_2F = 361$; m.p. = 92° C.

Example 4.—2,6-di-(2',4'-dichloro-benzyl)-4-fluoro-phenol $C_{20}H_{13}OFCl_4 = 430$; m.p. = 125–130° C. (instantaneous). On progressive heating, resolidification takes place at a higher temperature and then final m.p. = 150° C.

Example 5.—2,6-di-(2',4'-dichloro-benzyl)-4-chloro-phenol $C_{20}H_{13}OCl_5 = 446.5$; m.p. = 175° C.

Example 6.—2-(4'-fluoro-benzyl)-4-chloro-6-(2",4"-dichloro-benzyl)-phenol $C_{20}H_{14}FCl_3 = 395.5$; b.p.$_{.0.2}$ = 198–210° C.

Example 7.—2-(4'-fluoro-benzyl)-4-chloro-6-(3",4"-dichloro-benzyl)-phenol $C_{20}H_{14}OFCl_3 = 395.5$; b.p.$_{.0.3}$ = 195–215° C.

Example 8.—2-(4'-bromo-benzyl)-4-chloro-6-(2",4"-dichloro-benzyl)-phenol $C_{20}H_{14}OBrCl_3 = 458.5$; b.p.$_{.0.3}$ = 240–250° C.

Example 9.—2,6-dibenzyl-4-bromo-phenol $C_{20}H_{17}OBr = 353$; b.p.$_{.0.2}$ = 185–200° C.; crystallises at about 15° C.; $n_{23°}$ = 1.6313.

Example 10.—2,6-di-(4'-fluoro-benzyl)-4-bromo-phenol $C_{20}H_{15}OF_2Br = 389$; m.p. = 65° C.

Example 11.—2-(4'-chloro-benzyl)-4-bromo-6-(4"-fluoro-benzyl)-phenol $C_{20}H_{15}OFBrCl = 405.5$; b.p.$_{.0.3}$ = 208–212° C.

Example 12.—2-(4'-fluoro-benzyl)-4-bromo-6-(2",4"-dichloro-benzyl)-phenol $C_{20}H_{14}OFBrCl_2 = 440$; b.p.$_{.0.2}$ = 210–220° C.

The *in vitro* bacteriostatic activity of the compounds according to the invention has been determined in comparison with a control compound having no substitution in the rings of the benzyl groups, that is to say the compound, 2,6-dibenzyl-4-fluoro-phenol. The activity of the compounds with respect to a particular gram+bacteria, *Staphylococcus* London, a mould, *Aspergillus niger*, and a yeast, *Saccharomyces cerevisiae*, was determined.

The tests were carried out in a culture medium of the following composition:

| | Percent by weight |
|---|---|
| Bacteriological peptone free of indole | 40 |
| Sodium chloride | 5 |
| Glucose | 2 |
| pH, 7–7.2. | |

Progressive dilutions of the compound under test were used. The first test was carried out with a concentration of 1 thousandth. The dilutions went by steps of a thousandth from a concentration of 1 thousandth to $\frac{1}{10}$ thousandth; by steps of a 10 thousandth from $\frac{1}{10}$ thousandth to $\frac{1}{100}$ thousandth; and by steps of 100 thousandth from $\frac{1}{100}$ thousandth to 1 millionth. If the compound under test was found to be active at a dilution of 1 millionth, a further series was made up in steps of a millionth from a concentration of 1 millionth.

Two series of dilutions were made independently and the results obtained with the two series had to be identical.

In the case of the tests with the bacteria, the cultures were examined at the end of 24 hours in order to evaluate the activity of the compound under test. The tests with the mould and the yeast were made on Sabouraud medium and the readings were effected at the end of 8 days.

The results obtained are shown in the table below which gives the minimum active concentrations against the gram+bacteria, the mould and the yeast of various compounds according to the invention and of the control compound, 2,6-dibenzyl-4-fluoro-phenol.

| Compound of example number | A | $R_1$ | $R_2$ | $R_3$ | $R_4$ | $R_5$ | $R_6$ | Gram plus activity Staphylococcus London | Mould | Yeast |
|---|---|---|---|---|---|---|---|---|---|---|
| Control | F | H | H | H | H | H | H | 1/700,000 | | |
| 2 | F | F | H | H | H | H | F | 1/100,000 | 1/10,000 | |
| 3 | F | Cl | H | H | H | H | Cl | 1/1,000,000 | | |
| 4 | F | Cl | H | Cl | Cl | H | Cl | 1/300,000 | 1/50,000 | 1/10,000 |
| 1 | F | Cl | H | Cl | H | H | F | 1/2,000,000 | | |
| 5 | Cl | Cl | H | Cl | Cl | H | Cl | 1/300,000 | 1/10,000 | 1/10,000 |
| 6 | Cl | Cl | H | Cl | H | H | F | 1/4,000,000 | | |
| 7 | Cl | Cl | Cl | H | H | H | F | 1/3,000,000 | | |
| 8 | Cl | Cl | H | Cl | H | H | Br | 1/2,000,000 | | |
| 9 | Br | H | H | H | H | H | H | 1/1,000,000 | | |
| 10 | Br | F | H | H | H | H | F | 1/3,000,000 | | |
| 11 | Br | F | H | H | H | H | Cl | 1/2,000,000 | | |
| 12 | Br | F | H | H | Cl | H | Cl | 1/1,000,000 | 1/40,000 | 1/10,000 |

It will be seen from this table, firstly, that the compounds having at least one fluoro or bromo substituent in the rings of the benzyl groups have, in general, a greater activity against gram+bacteria than compounds having chloro substituents in these rings, and, secondly, that the asymmetric compounds are more active than symmetrical compounds. The most active compounds are, in effect, among those in which A is a fluorine atom, the compounds of Examples 1 and 3; among those in which A is a chlorine atom, the compounds of Examples 6, 7 and 8; and among those in which A is a bromine atom, the compound of Example 10. As can be seen from the table and examples, one of $R_4$ and $R_5$ are hydrogen.

I claim:
1. A compound of the formula:

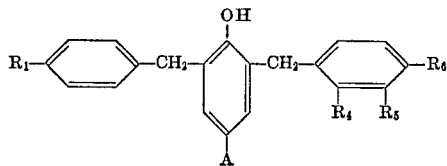

wherein

A is fluoro, chloro or bromo;
$R_1$ is fluoro or bromo;
$R_4$ and $R_5$ are each chloro or hydrogen, provided that only one of $R_4$ and $R_5$ is chloro, and
$R_6$ is fluoro or chloro.

2. 2,6-Di-(4'-chloro-benzyl)-4-fluoro-phenol.
3. 2-(4' - Fluoro-benzyl)-4-(fluoro-6-(2'',4'' - dichlorobenzyl)-phenol.
4. 2-(4'-Fluoro-benzyl) - 4 - chloro-6-(2'',4''-dichlorobenzyl)-phenol.
5. 2-(4'-Fluoro-benzyl) - 4 - chloro-6-(3'',4''-dichlorobenzyl)-phenol.
6. 2-(4'-Bromo-benzyl) - 4 - chloro-6-(2'',4''-dichlorobenzyl)-phenol.
7. 2,6-Di-(4'-fluoro-benzyl)-4-bromo-phenol.
8. 2-(4'-Chloro-benzyl)-4-bromo - 6 - (4''-fluoro-benzyl)-phenol.
9. 2-(4'-Fluoro-benzyl) - 4 - bromo-6-(2'',4''-dichlorobenzyl)-phenol.

References Cited
UNITED STATES PATENTS
1,880,566  10/1932  Weiler et al. _____ 260—619 A
2,330,722  9/1943  Lieber _____ 260—619 A X
2,733,273  1/1956  Rigterink _____ 260—619 A
2,055,953  9/1936  Swallen _____ 260—619 A X FOREIGN PATENTS
525,404  4/1931  Germany _____ 260—619 R
542,069  12/1931  Germany _____ 260—619 R OTHER REFERENCES
Berlstein, "Org. Chemie.," vol. V, III supplement, 5th part, pp. 3686–7, 1949.

HOWARD T. MARS, Primary Examiner
N. MORGENSTERN, Assistant Examiner

U.S. Cl. X.R.
424—347